United States Patent [19]

Kang

[11] Patent Number: 5,734,529
[45] Date of Patent: Mar. 31, 1998

[54] HEAD DRUM ASSEMBLY FOR USE IN A VIDEO CASSETTE RECORDER

[75] Inventor: Dong-Ho Kang, Seoul, Rep. of Korea

[73] Assignee: Daewoo Electronics Co., Ltd., Seoul, Rep. of Korea

[21] Appl. No.: 568,867

[22] Filed: Dec. 7, 1995

[30] Foreign Application Priority Data

Feb. 15, 1995 [KR] Rep. of Korea ............... 1995-2754

[51] Int. Cl.$^6$ ............... G11B 5/52; G11B 21/00; G11B 21/18
[52] U.S. Cl. ............... 360/107; 360/108; 360/130.24
[58] Field of Search ............... 360/107, 108, 360/84, 85, 130.24

[56] References Cited

U.S. PATENT DOCUMENTS

| | | | |
|---|---|---|---|
| 5,001,585 | 3/1991 | Schalk | 360/108 |
| 5,019,926 | 5/1991 | Van Tuijl et al. | 360/108 |
| 5,325,248 | 6/1994 | Tabuchi et al. | 360/108 |

Primary Examiner—Stuart S. Levy
Assistant Examiner—Adriana Giordana
Attorney, Agent, or Firm—Anderson, Kill & Olick, P.C.

[57] ABSTRACT

A head drum assembly for use in a video cassette recorder comprises a rotary shaft, a flange, a plurality of the heads, a rotary drum, and signal transmitting means, wherein the signal transmitting means has a lower stator transformer mounted on a top surface of the stationary drum, the lower stator transformer provided with a plurality of grooves, each of the lower stator grooves being wound with a coil, a stopper ring mounted on the lower stator transformer, a rotor transformer attached on the circumferential protruding portion of the flange and provided with a plurality of grooves on its upper and lower surfaces, each of the upper rotor and the lower rotor grooves being wound with a coil, and an upper stator transformer mounted on the stopper ring and provided with a plurality of grooves, each of the upper stator grooves being wound with a coil, each of the lower stator grooves being aligned with each of the lower rotor grooves and each of the upper stator grooves being aligned with each of the upper rotor grooves.

3 Claims, 4 Drawing Sheets

HEAD DRUM ASSEMBLY FOR USE IN A VIDEO CASSETTE RECORDER

FIELD OF THE INVENTION

The present invention relates to a head drum assembly for use in a video cassette recorder; and, more particularly, to a head drum assembly having a plurality of transformers capable of easily transmitting signals from a plurality of heads to a signal processing system therein or vice versa.

BACKGROUND OF THE INVENTION

There is shown in FIG. 1 a conventional head drum assembly 100 for use in a video cassette recorder including a rotating shaft 1, a rotary drum 2, a flange 3, a stationary drum 4, two sets of bearings 5, a pair of heads 6, a rotor transformer 7, a stator transformer 8, and a plurality of coils 9.

The rotary drum 2 is adjoined with an upper portion of the rotating shaft 1 via the flange 3; and the stationary drum 4 is attached to a lower portion of the rotating shaft 1 through the two sets of bearings 5.

Each of the heads 6 is fastened to a bottom surface of the rotary drum 2.

The rotor transformer 7 provided with a plurality of 7a on its lower surface is fixed on a lower surface of the flange 3, and the stator transformer 8 provided with a plurality of grooves 8a on its upper surface is fixed on a top surface of the stationary drum 4 using, e.g, a bonding agent, in such a way that each groove 7a on the rotor transformer 7 is aligned with each groove 8a on the stator transformer 8 correspondingly but separated by a predetermined gap therebetween. Furthermore, the number of rotor grooves 7a is identical as that of the stator grooves 8a and there are twice as many the rotor grooves 7a and the stator grooves 8a as there are heads 6.

The plurality of coils 9 can be classified into the rotor transformer coils 9a, each of which is wound around each of the grooves 7a of the rotor transformer 7, and the stator transformer coils 9b, each of which is wound around each of the grooves 8a of the stator transformer 8. Furthermore, two of the rotor transformer coils 9a are connected to one of the heads 6, the remaining rotor transformer coils 9a being connected to the other head 6, and each of the stator transformer coils 9b is connected to a signal processing system (not shown).

Consequently, data on a magnetic tape (not shown) read by the heads 6 is transmitted to the signal processing system through the plurality of coils 9 in the rotor and the stator transformers 7, 8.

In such a head drum assembly, as the number of heads is increased with a view to improving the picture quality, the number of grooves provided on each of the rotor and the stator transformers must also increase, which, in turn, decreases the distance between the grooves due to the size limitation of the transformer, thereby raising the possibility of crosstalks.

In order to solve the aforementioned problem, there is disclosed in Japanese Utility model Laid-Open publication No. 60-51603 (Apr. 11, 1985) a head drum apparatus including two pairs of transformers. However, in this case, the manufacturing process of the head drum assembly becomes rather complicated, while enlarging the size of the head drum assembly.

SUMMARY OF THE INVENTION

It is, therefore, a primary object of the present invention to provide a head drum assembly having a plurality of transformers capable of easily transmitting signals from a plurality of heads to a signal processing system therein or vice versa, without enlarging the size thereof.

In accordance with one aspect of the present invention, there is provided a head drum assembly for use in a video cassette recorder comprising: a rotating shaft; a flange with a circumferential protruding portion tightly fixed to an upper portion of the rotating shaft; a rotary drum pressed in and fixed to the flange; a stationary drum attached to a lower of the rotating shaft through a plurality of bearings; a plurality of heads fastened to a bottom surface of the rotary drum; and means for transmitting signals, wherein the signal transmitting means include a lower stator transformer mounted on a top surface of the stationary drum and provided with a plurality of grooves, each of the grooves being wound with a coil, a stopper ring mounted on the lower stator transformer, a rotor transformer attached on the circumferential protruding portion of the flange and provided with a plurality of grooves on its upper and lower surfaces each of the upper rotor and the lower rotor grooves being wound with a coil, and an upper stator transformer mounted on the stopper ring and provided with a plurality of grooves, each of the upper stator grooves being wound with a coil, each of the lower stator grooves being aligned with each of the lower rotor grooves and each of the upper stator grooves being aligned with each of the upper rotor grooves.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
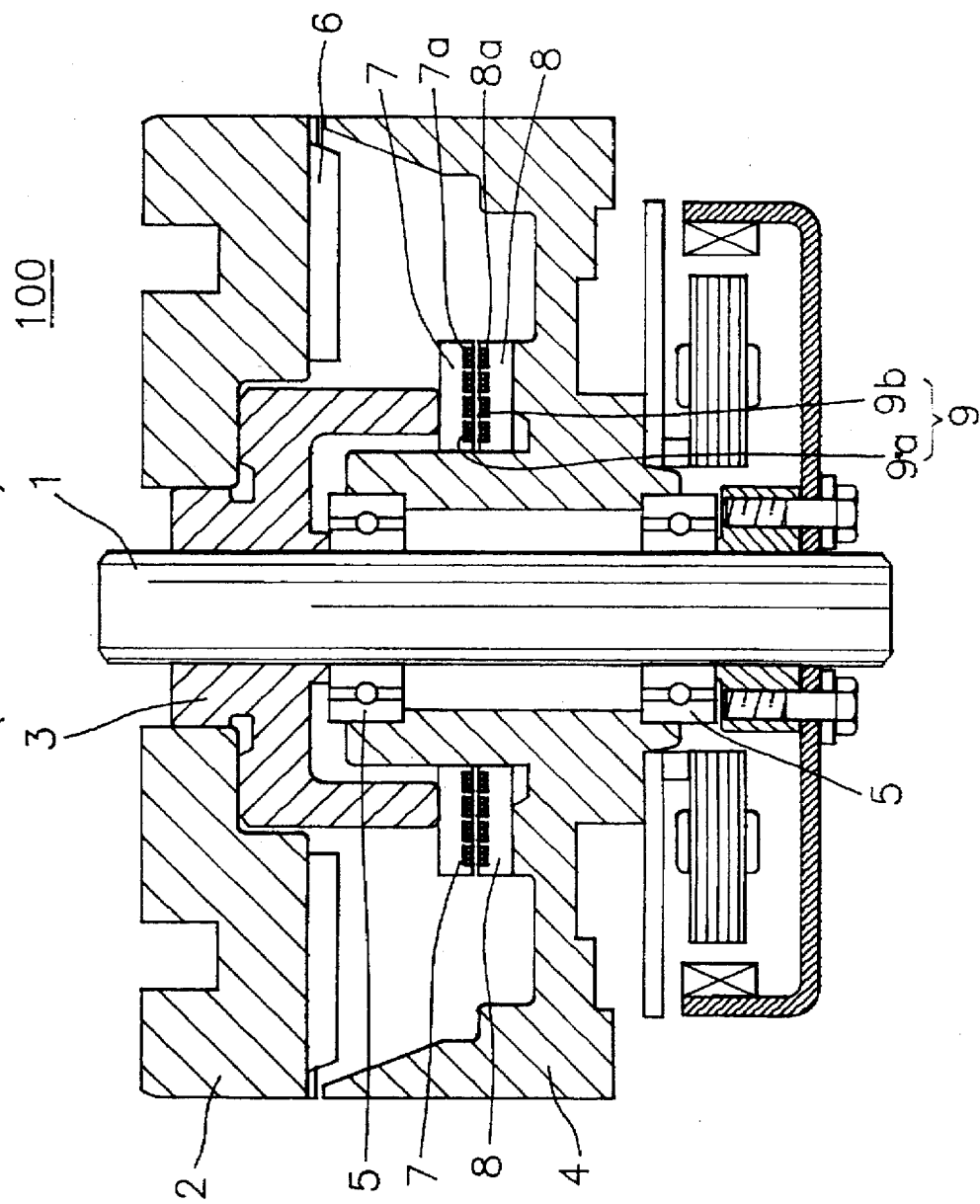
FIG. 1 shows a cross sectional view of the conventional head drum assembly.
Figure 2:
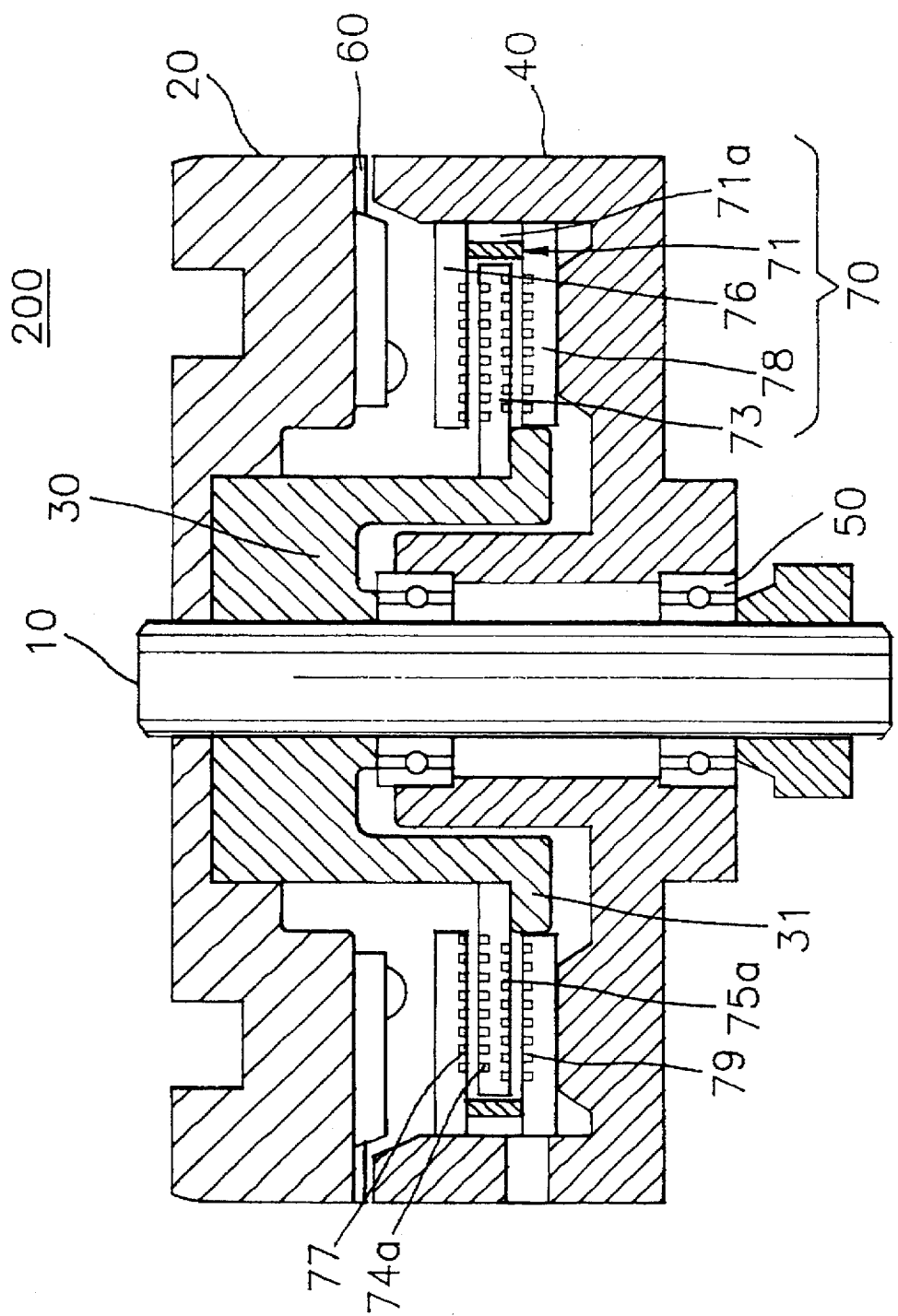
FIG. 2 presents a cross sectional view of the head drum assembly in accordance with the present invention.

There is shown in FIG. 2 an inventive head drum assembly 200 for use in a video cassette recorder including a rotating shaft 10, a rotary drum 20, a flange 30, a stationary drum 40, two sets of bearings 50, a plurality of heads 60 and a signal transmitting device 70.

The flange 30 has a circumferential protruding portion 31 and the signal transmitting device 70 includes a stopper ring 71, a rotor transformer 73, and an upper and a lower stator transformers 76, 78.

The lower stator transformer 78 provided with a plurality of grooves 79 on an upper surface thereof is fixed on a top surface of the stationary drum 40, wherein the number of the grooves N being twice as many as the number of heads 60, and of the grooves 79 is wound with the coil 72.

The stationary drum 40 provided with the lowerstator transformer 78 is attached to a lower portion of the rotating shaft 10 through the two sets of bearings 50 for rotatably supporting the rotating shaft 10.

Figure 3:
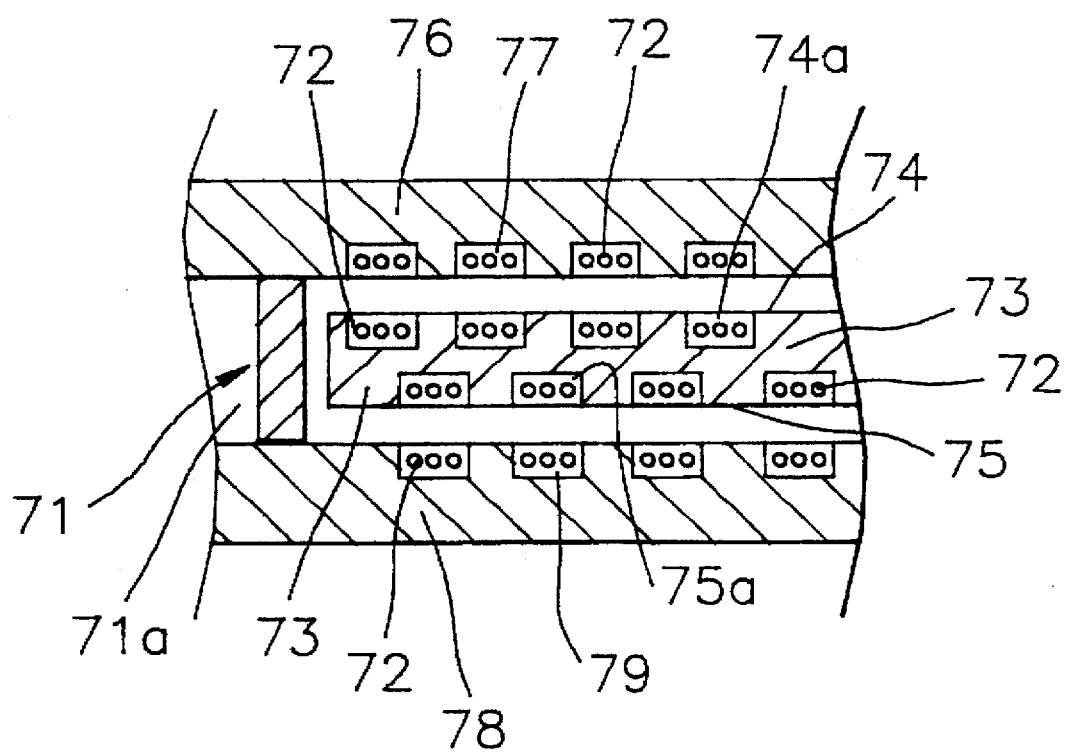
FIG. 3 offers a partial cross sectional view of the signal transmitting means in accordance with the present invention.

The stopper ring 71 having an identical number of notches 71a as that of the heads 60 is mounted on the lower stator transformer 78. The rotor transformer 73, as shown in FIG. 3, has an upper and a lower surfaces 74, 75 which are provided with aforementioned number N of grooves 74a, 75a, respectively, wherein each of the grooves 74a, 75a is wound with the coil 72.

The flange 30 is tightly fixed to an upper portion of the rotating shaft 10 and the rotor transformer 73 is attached on a top surface of the circumferential protruding portion 31 of the flange 30 in a space enclosed by the stopper ring 71 in such a way that each of the lower rotor grooves 75a is aligned with each of the lower stator grooves 79.

The upper stator transformer 76, provided with a previously mentioned number N of grooves 77 on a lower surface thereof is fixed on a top surface of the stopper ring 71 in such a way that each of the upper stator grooves 77 in which each of the coils 72 for transmitting signal is wound is aligned with each of the upper rotor grooves 74a of the rotor transformer 73. Then, the rotary drum 20 is pressed and fixed to the flange 30.

Figure 4:
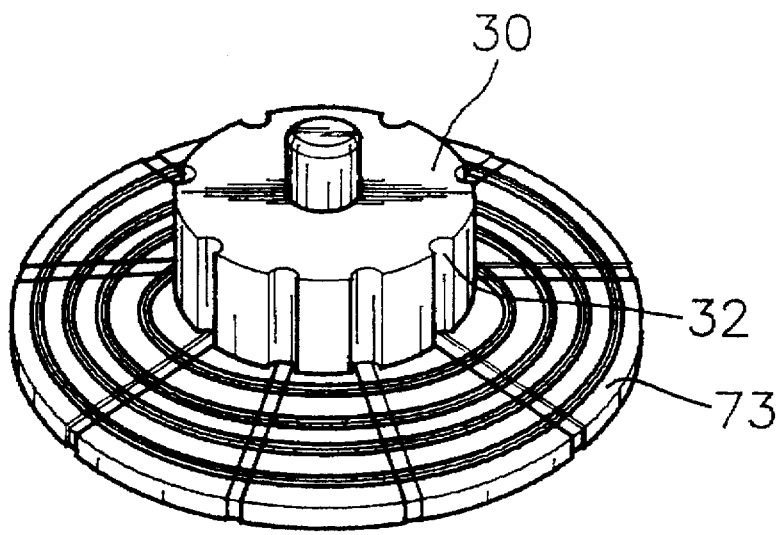
FIG. 4 represents a perspective view of the rotor transformer and the flange assembly in accordance with the present invention.

In order to facilitate connections of the coils 72 between each of the heads 60 fastened to a bottom surface of the rotary drum 20 and the rotor transformer 73, the flange 30, on its external surface, may be preferably provided with twice as many furrows 32 as heads 60, wherein each of the furrows 32 extends from top of the flange 30 to bottom thereof and is equally spaced apart, as shown in FIG. 4.

Figure 5:
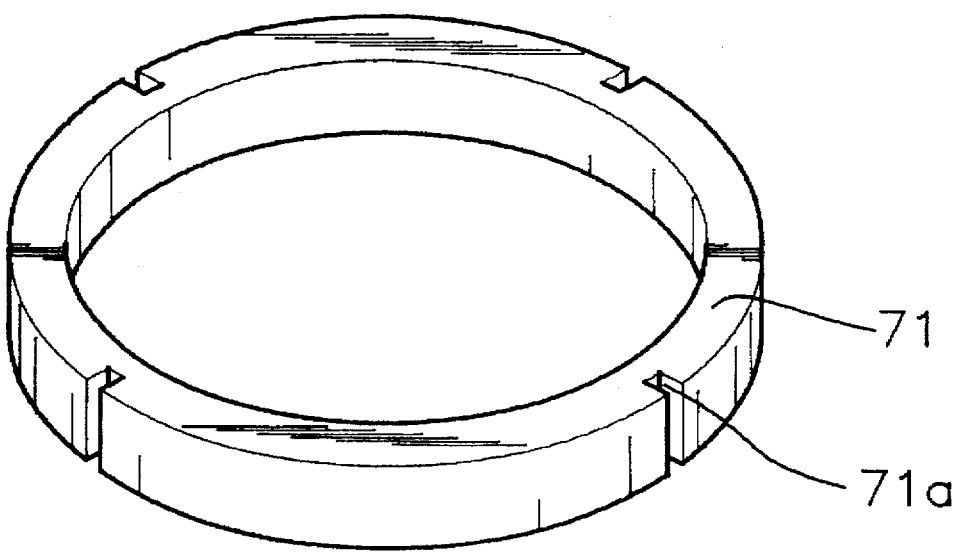
FIG. 5 depicts a perspective view of the stopper ring in accordance with the present invention.

Furthermore, as shown in FIG. 5, in order to make the connection of a lead line (not shown) from the upper stator transformer 76 attached on the top surface of the stopper ring 71 to the signal processing system easy, the stopper ring 71, on its external surface, may be preferably provided with an identical number of notches 71a as that of the heads 60, wherein each of the notches 71a extends from top of the stopper ring 71 to bottom thereof.

The signals recorded on a magnetic tape (not shown) read by the heads 60 are transmitted from the coils 72 around the grooves 74a, 75a on each of the upper and the lower surfaces 74, 75 of the rotor transformer 73 to the coils 72 on the grooves 77, 79 provided on each of the upper and the lower stator transformers 76, 78 and then to the signal processing system therefrom.

In such a head drum assembly, signals from the plurality of heads are easily transmitted to the signal processing system by the rotor transformer and the upper and the lower transformers or vice versa to thereby obtain video signals of high sensitivity and quality, without enlarging the size thereof.

Although the invention has been shown and described with respect to the preferred embodiments, it will be apparent to those skilled in the art that various changes and modifications may be made without departing from the scope of the invention as defined in the following claims.

What is claimed is:

1. A head drum assembly for use in a video cassette recorder comprising:

a rotating shaft;

a flange with a circumferential protruding portion and being tightly fixed to an upper portion of the rotating shaft;

a rotary drum fixedly pressed in the flange;

a stationary drum attached to a lower portion of the rotating shaft through a plurality of bearings;

a plurality of heads fastened to a bottom surface of the rotary drum; and means for transmitting signals to and from the heads, wherein the signal transmitting means include a lower stator transformer mounted on a top surface of the stationary drum and provided with a plurality of grooves, each of the grooves being wound with a coil, a stopper ring mounted on the lower stator transformer, a rotor transformer attached on the circumferential protruding portion of the flange and respectively provided with a plurality of grooves on its upper and lower surfaces, each of the grooves on the upper surface and the lower surface of the rotor transformer being wound with a coil, and an upper strator transformer mounted on the stopper ring such that the stopper ring is positioned between the upper strator transformer and the lower strator transformer and provided with a plurality of grooves, each of the upper strator grooves being wound with a coil, each of the lower strator grooves being aligned with each of the lower rotor grooves and each of the upper strator grooves being aligned with each of the upper rotor grooves.

2. The head drum assembly of claim 1, wherein the flange is provided with one or more furrows, each furrow extending from top of the flange to bottom thereof.

3. The head drum assembly of claim 1, wherein the stopper ring is provided with one or more notches, each notch extending from top of the stopper ring to the bottom thereof.

* * * * *

UNITED STATES PATENT AND TRADEMARK OFFICE

CERTIFICATEOF CORRECTION

PATENT NO. : 5,734,529
DATED : March 31, 1998
INVENTOR(S) : Dong-Ho Kang

It is certified that error appears in the above-identified patent and that said Letters Patent is hereby corrected as shown below:

On title page, item

[30] Foreign Application Priority Data

Feb. 15, 1995 [KR] Rep. of Korea 95-2754

Signed and Sealed this

Sixteenth Day of June, 1998

Attest:

BRUCE LEHMAN

Attesting Officer     Commissioner of Patents and Trademarks